July 13, 1965  R. F. WILLIAMS, JR., ETAL  3,194,863
COMPRESSION ROLLING OF MULTIPLE STRIPS OF ORGANIC POLYMERS
Filed July 24, 1961
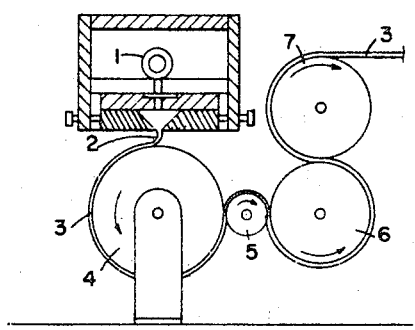
*Fig. 1*
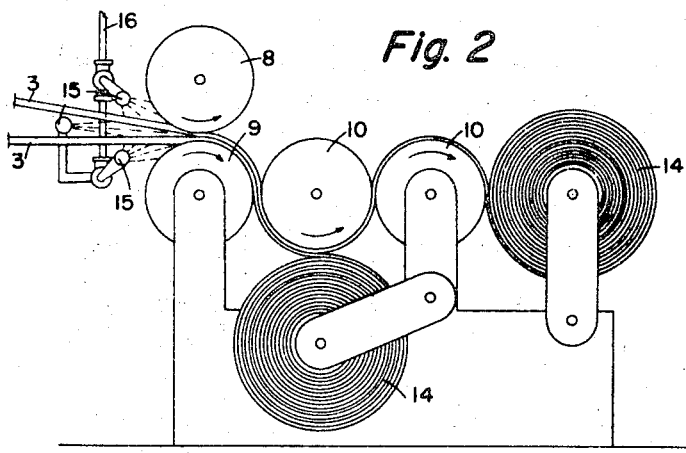
*Fig. 2*
*Fig. 3*
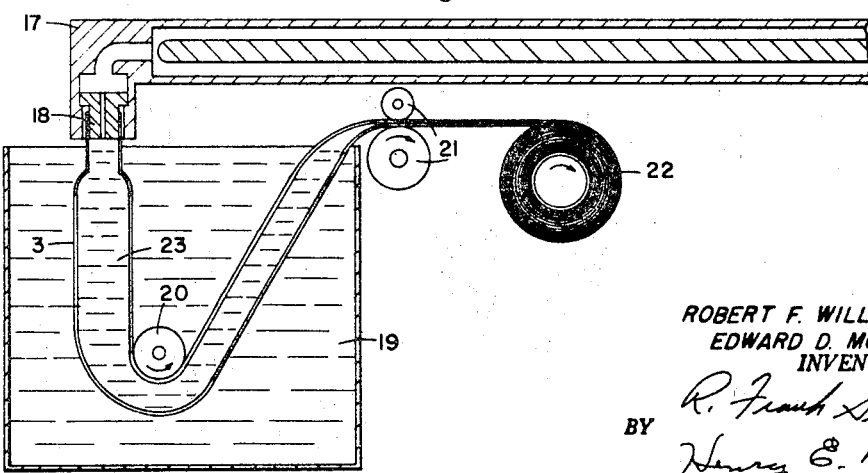
ROBERT F. WILLIAMS JR.
EDWARD D. MORRISON
INVENTORS
BY R. Frank Smith
Henry E. Byers
ATTORNEYS

United States Patent Office 3,194,863
Patented July 13, 1965

3,194,863
COMPRESSION ROLLING OF MULTIPLE STRIPS OF ORGANIC POLYMERS
Robert F. Williams, Jr., and Edward D. Morrison, Rochester, N.Y., assignors to Eastman Kodak Company, Rochester, N.Y., a corporation of New Jersey
Filed July 24, 1961, Ser. No. 126,183
9 Claims. (Cl. 264—209)

This invention concerns the fabrication of polyolefin sheeting by compression rolling multiple strips.

Polyolefin sheeting has found wide acceptance in a wide variety of uses, such as packaging, moisture proofing barriers in construction, temporary protective sheeting, agricultural mulching, and the like. In addition, the lower polyolefins, such as polyethylene and polypropylene, have been used for such common items as squeeze bottles, dishpans, mixing bowls, wastebaskets, and the like. However, polyethylene has been limited in its adaptations to packaging due to its limpness and the cloudy nature of the film, especially in its thicker forms.

It has been desirable to obtain a polyolefin film which could be substituted for cellophane in packaging machinery, since polyethylene, in particular, can be made from relatively inexpensive materials and since it has many inherent desirable properties, such as toughness, moisture resistance, and the like.

It has also been desirable to obtain polyolefin films which could be substituted for the photographic film supports customarily used, such as cellulose acetate, which would be photographically inactive, heat resistant, resistant to moisture vapor transmission, relatively inexpensive and have good dimensional stability.

U.S. patent application Serial No. 9,567, now abandoned, filed February 18, 1960, in the names of Williams et al., describes a process of compression rolling polyolefin films employing a lubricant by reducing the polyolefin film ½ to ⅒ in thickness in a single pass. U.S. patent application Serial No. 831,879, now abandoned, filed August 5, 1959, in the names of Williams et al., describes compression rolling polyolefin films without using a lubricant but employing substantially greater pressure to obtain the same reduction in thickness. However, both of these processes compression roll one film at a time and it has been desirable to increase the speed of compression rolling and/or discover a way of obtaining thinner films than have been previously obtained using this method.

We have found that compression rolling multiple strips of polyolefin sheeting enables us to use the same set of rollers for obtaining 2 or more compression-rolled strips at the same time. Moreover, by choosing sheets having appropriate thickness, we can obtain relatively thin compression rolled films.

One object of this invention is to provide a method of compression rolling multiple strips of sheeting prepared from olefin polymers. Another object is to provide high gloss high clarity polyolefin films. An additional object is to provide a method of obtaining very thin gauge compression rolled polyolefin films.

The above objects are obtained by passing 2 or more strips of film through the compression rolls at the same time.

Two or more sheets of the polyolefin are fed into the compression rolls having a lubricant covering the surfaces of the polyolefin sheeting as it contacts the rolls at the nip. When the sheets have similar chemical composition lubricant must also cover the surface of the polyolefin where it contacts another polyolefin surface as the two or more sheets are pressed together at the nip of the rolls. However, if chemical composition of the sheets is dissimilar enough, such as polyethylene rolled with polypropylene, no lubricant is required between the dissimilar sheets.

By a lubricant is meant a liquid, grease, or solid, such as sodium stearate, graphite, and the like. In the event that water is used as a lubricant, it is desirable to add a wetting agent. A sufficient amount of the lubricant is used to cover the surface of the polyolefin as it passes between the rollers. The application may be by spray, wick, immersion, coating, etc. Methods of insuring surface coverage may be used, such as air knife, bar, etc.

Further improvement in the processing characteristics may be obtained if the polyolefin sheet is obtained by quenching a molten polyolefin. The polyolefin is first heated to obtain a clear melt and then extruded through a suitable die to obtain a film of the desired thickness. The film may then be quenched by passing it into cold water or else to a chilled cold roll so that the polymer is solidified and cooled during the contact with the support to a temperature of at least 100° F. below its frost line temperature within at least 60 seconds from the time it leaves the extruder. The rate of cooling must be rapid enough to limit the formation of spherulites. In our preferred embodiment, 60° F. water is used to cool the roller upon which the melted polyolefin is extruded, and no appreciable draw-down occurs during extrusion to the chilling step. However, the cooling liquid could be as warm as 140° F. and could be cooled down to about −65° F., depending upon the melting point of the polyolefin and the size of the cooling medium.

The frost line temperature is the temperature when the film is being melt cast from a polyolefin composition it becomes suddenly hazy or shows a significant loss in transparency.

Following the roll-down operation, a polyolefin sheet may be heat treated under sufficient tension to prevent dimensional changes to provide dimensional stability, particularly for use in photographic applications. One requirement for film support applications in the graphic arts fields is that the support shall shrink less than 0.01% in 24 hours at 160° F.

Various methods of heat treating polyolefin sheeting may be used, such as surface winding on a take-up roll and then heating the roll in an oven. However, temperature and time relationships can be balanced, a higher temperature relaxing the film in a shorter time. Temperature at which the film is relaxed is preferably greater than 10° F. less than the creep temperature of the particular polyolefin, and must be lower than the fatigue temperature of the polyolefin.

The creep temperature is the temperature at which the length of a test specimen has increased or decreased 2% of its original length when the test specimen is supporting a linear load of 10 grams per square meter and the temperature is being increased at the rate of 10° C. per minute. By fatigue temperature, as used herein, is intended to be the temperature at which the tensile strength of the polyolefin is between 14 and 20 pounds per square inch.

Solutions or emulsions of anti-oxidants, anti-blocking, and/or slip agents can be applied to the interfaces of the strips in the lubricant. Typical additives which may be used are disclosed in copending U.S. patent application Serial No. 30,323, filed May 19, 1960, in the names of Williams et al.

The rate at which the film is rolled by the pressure rolls is not critical, since satisfactory films can be produced at speeds from 2½ feet per minute up to about 1700 feet per minute.

It will be appreciated that our process is particularly adaptable to compression rolling lay-flat tubing. This tubing can be prepared by various methods already known in the art. However, in our preferred embodiment, polypropylene tubing is prepared by dry extruding seamless tubing into a water bath where the tube is inflated by filling with a liquid having a higher density than water before running the tubing through pinch rolls. The gauge of the tubing is determined by the liquid level inside the tubing, the density of the liquid, and the draw-down between the die and the pinch rolls. An improved product is obtained using this method since the lateral stretching of the polypropylene occurs at the time it is quenched.

The accompanying drawings illustrate our invention.

FIGURE 1 shows the extrusion of polyolefin 3 extruded from the extruder 1 through the die lips 2 onto a chilled roller 4 around the idler roller 5 through the tension rollers 7 and 6.

FIGURE 2 illustrates the compression rolling of two sheets of polyolefin 3. The polyolefin sheets 3 are run past the lubricating nozzles 15 associated with pipe 16 connected to a source of lubricant. The polyolefin sheets 3 pass between the pressure rollers 8 and 9, at which point the polyolefin sheets 3 are reduced in thickness to ½ to 1/10 of the thickness of the sheets as extruded. Next the polyolefin sheets 3 pass around the idler rollers 10 to take-up 14. All of the rollers are similarly supported except for the pressure rollers, which require extra heavy supports.

FIGURE 3 illustrates our preferred embodiment for preparing lay-flat tubing. The polyolefin 3 extruded from the extruder 17 through the die lips 18 into a liquid quench bath 19, around guide 20 through pinch rolls 21 to take-up roll 22. A liquid 23 having a greater density than water is contained inside of the tubing as it is extruded into the water bath.

It would be apparent to one skilled in the art that the position of the rollers may be changed from horizontal to vertical and that they may be arranged in various positions relative to each other, such as in the S or Z positions. The idler rollers are used to facilitate transfer of the polyolefin sheeting without excessive wrinkling. However, these could be dispensed with in the interest of conserving space.

It will also be apparent that lay-flat tubing can be slit so that it can be run through having both the inside surfaces and the outside surfaces lubricated during the compression rolling operations and that modification of the equipment can be made to provide for compression rolling more than two sheets at one time.

In the event that more than two sheets are to be compression rolled at one time, the immersion type of apparatus may be used for applying the lubricant to the films. A simple device comprises a roller in a suitable tank of liquid adapted so that the film passes under the roller and is coated with lubricant on both surfaces. Lubricant may also be applied by spray.

The following examples are intended to illustrate our invention but are not intended to limit it in any way:

*Example 1*

Two strips of polyethylene having a gradient density of 0.965 gram/cc. and 4.7 to 5.3 mils in thickness were fed through a lubricating bath of 0.15% Aerosol OT and water, then between pinch rolls which applied the tension and pressure necessary to align the two strips as they entered the nip of compression roll mill. The compression rolls of the mill were heated to 170° F. and run at 7½ ft./min. After passing through the nip of the rolls the films were separated and wound on individual rolls to yield films 1.6 to 1.7 mils thick. The moisture vapor transmission rates of these films were determined to be 0.11 gram/100 sq./in./24 hrs.

*Example 2*

A 2 mil strip and a 5 mil strip of polyethylene, both having a gradient density of 0.960 gram/cc., were aligned by running over a steel roll with a Babco "Electro-Grip" generating a magnetic field from one inch above the surface of the roll. Tension was applied to the strip by use of a brake on the shaft of the steel roll. The aligned films were passed through a lubricating bath of 0.15% Aerosol OT/water and separated below the liquid level of the bath by an idler roll to allow the interfaces of the strips to be lubricated. From the lubricating bath the strips were compressed between two steel rolls heated to 180° F. and run out at seven feet per minute. The compressed strips were separated into films 0.4 mil thick and 1.1 mils thick and wound individually. Both films shrank 1.7% in the machine direction when heated to 143° F.

*Example 3*

Two five-mil strips of polyethylene having a gradient density of 0.965 gram/cc. were compression rolled using an emulsion of 2% carnauba wax, .03% Aerosol OT and 97.97% distilled water. The rolls were heated to 200° F. and exerted a pressure of 1,000 pounds per linear inch on the strips in the nip. These rolls were operated at 100 ft./min. Compression rolled films were separated and wound individually after passing between the rolls. The finished films were 1.3 mils thick.

*Example 4*

A one-mil polyethylene strip having a gradient density of 0.920 gram/cc. and a 6-mil polyethylene strip of 0.962 gram/cc. gradient density were aligned by passing them over a steel roll with a Babco "Electro-Grip" generating a magnetic field from one inch above the surface of the roll. Tension was maintained on the two strips from the magnetic field to the compression rolls by use of a brake on the shaft of the steel roll. Before entering the nip of the rolls, lubricant was applied to both sides of each strip. The compression roll in contact with the surface of the strip of low density polyethylene was heated to 100° F. and the roll contacting the surface of the high density strip was 160° F. After compression rolling the films were separated as a 0.3 mil low density polyethylene film having 1.2% haze and a 1.3 mil high density polyethylene film having 2.3% haze. Haze values were determined using ASTM Test Method D-1003-53, "Haze and Luminous Transmittance of Transport Plastics."

*Example 5*

Two five-mil strips of polyethylene having a density of 0.965 gram/cc. as measured in a gradient density column were aligned by passing over a steel roll with a Babco "Electro-Grip" generating a magnetic field from one inch above the surface of the roll. The drive on the steel roll was adjusted so that the strips were fed to the nip of a compression roll mill at the rate of 2 ft./min. One roll of the compression roll mill was heated to 200° F. and the other roll was heated to 115° F. After passing through the nip of the roll mill, the compression rolled films were separated and wound individually as 1-mil films. The one-mil films were produced at the rate of 10 ft./min.

Fresh asparagus was washed and trimmed, then heat sealed in packages from the polyethylene compression rolled in contact with the roll heated to 115° F. The package was cut so that the machine directed in compression rolling was perpendicular to the length of the asparagus stalks. The heat-sealed package of asparagus was submerged in boiling water for three minutes and when taken out had formed a firm hard, bundle which was immediately frozen at 0° F. After two weeks storage the bundle was removed from the freezer and the asparagus cooked while still packaged in the polyethylene. Flavor and color of the asparagus after freezing and cooking was essentially that of the fresh asparagus.

A cardboard box of paper tissues was overwrapped and heat sealed with the film which had been compression rolled in contact with the roll heated to 200° F. The overwrapped package was incubated at 120° F. for 72 hours. After incubation the overwrapped box showed no signs of distortion due to film shrinkage.

Example 6

Lay-flat polyethylene tubing having a density of 0.915 gram/cc. as measured in a gradient density column was extruded into and expanded in a water bath as described in Example 9. No attempt was made to remove the water film that adhered to the inside wall of the tube. The collapsed tube which was 3½" wide was lubricated with Aerosol OT/water and then compression rolled between rolls heated to 185° F. After compression rolling, one side of the tube was slit and the tube opened to form a film 7" wide.

Example 7

Two strips of polyethylene having a density of 0.932 as measured in a gradient density column were compression rolled in a metal rolling mill without lubricant on the surface or interfaces of the strips. Both compression rolls were heated to 140° F. and set to compress the strips from 5.9 mils to 1.8 mils in a single pass. The compression rolled films were separated and wound as individual films.

Example 8

The separation between the rolls of a metal rolling mill was set so that a single strip of lubricated polyethylene having a density of 0.965 gram/cc. as measured in a gradient density column was compressed from 5.2 to 1.7 mils in a single pass. The haze of the film after rolling was significantly reduced but the film was not classified as a clear film. Two strips of the same polyethylene were aligned and lubricated and then passed between the rolls with the separation set exactly the same as it had been for the single strip. The strips were separated as 1.2 mil films and were classified as clear films. Three strips of the same polyethylene were aligned and compression rolled with lubricants without the separation of the rolls being changed. After rolling, the stack was separated into three individual films 1.3 mils thick and were classified as clear films.

Example 9

A polyethylene composition having a melt index of 1.7 and molecular weight of 30,000 was extruded from a 1½ inch three-zone extruder as tubing 1½ inch I.D. The temperatures of the heating zones of the extruder were: Feed zone, 102° C.; preheat zone, 195° C.; and melting zone, 216° C. The die temperatures were 230° C. at the throat and 260° C. at the lips. The tubing ran four inches in air from the die lips to the surface of the water bath maintained at 25° C. The tubing was partially filled with water while being threaded through the bath to prevent the walls from collapsing. After the tubing was threaded through the pinch rolls, a slit was cut in the tube behind the pinch rolls and the water level raised in the tube until the diameter of the tube was extended to 5½ inches. The tubing was extruded at the rate of 10.9 inches per minute and drawn off at 40 inches per minute. The orientation in the tubing was evenly balanced and the transparency was good.

Example 10

A polyethylene composition having a melt index of 7 and average molecular weight of 23,000 was extruded as 1½ inch I.D. tubing at 12 inches per minute from a 1½ inch extruder under the following conditions: Temperature of feed zone, 90° C.; temperature of preheat zone, 185° C.; temperature of plasticizing zone, 210° C.; temperature of die throat, 200° C.; temperature of die lips, 210° C. The tubing was exposed to room atmosphere for twenty seconds, then submerged in a 20° C. water bath. Ethylene glycol was maintained at a level inside the tubing to extend the diameter of the tubing to 4½ inches, and the speed of the pinch rolls was set to remove the tubing at the rate of 3 feet per minute. The orientation in the finished tubing was balanced, and the transparency of the tubing was excellent.

Example 11

All conditions were the same as Example 1, but the tubing was extended by adding a solution of 1.0% Linde X-520 Silicone, 1.0% magnesium stearate, and 98% water. The blocking tendency of the tubing was retarded by the magnesium stearate and silicone which adhered to the tubing during extension. The properties of the tubing other than blocking were not affected by the reagents.

The limits of producing "lay-flat tubing" by this process are not critical. To produce the clear lay-flat tubing or sheeting by this process, it is necessary to obtain a clear melt of the polymer before forming the tubing and to quench the tubing before random crystallization occurs. Although the process could be adapted to the production of lay-flat tubing from the non-crystalline type polymers such as polystyrene and hydrolyzed cellulose esters, it is doubtful there would be any definite advantages over the gaseous method. The advantages of this process are most apparent in the production of lay-flat tubing and sheeting of the crystalline polymers such as nylon, polyethylene-terephthalate, the triesters of cellulose, and the polyolefins.

Aerosol OT is sodium dioctyl sulfosuccinate.

Improvement in some of the characteristics of polyolefin film prepared according to this process may be obtained by stretching or tentering the film after it has been extruded and quenched (if the quenching step is used). The stretching is done in a direction laterally perpendicular to the direction in which the pressure rolling takes place. The stretching step may be carried out using customary tentering equipment or may be obtained by extruding a plastic tubing which is extended laterally as shown above or by causing the tubing to be filled with a fluid, such as air.

The extruders used in the above examples are typical extruders sold by the Modern Plastic Machinery Corporation, Lodi, New Jersey. A typical 3½ inch Modern Plastics extruder is shown on page 885 of Modern Plastic encyclopedia issued September 1957, Modern Plastics magazine, New York, New York.

It will be appreciated that by crystalline polyolefins, those substantially crystalline containing at least 65% crystalline polyolefin are intended. Polyethylene having a density of .910–.970 gram per cc. may be used.

The polyolefin films obtained according to our invention include those prepared from the alpha olefins having 2–10 carbon atoms and blends of these polyolefins as well as copolymers. The sheets which are rolled between the compression rollers may be the same chemical composition or different polyolefins.

Coatings may be applied to the polyolefin sheets prepared according to our invention using methods known in the art. For instance, the surface may be made hydrophilic by oxidizing using the method such as flaming, treatment with a sulfuric acid-dichromate mixture, peroxide, nitric acid, or the like. The film may be exposed to chlorine gas or to electron bombardment with or without a corona discharge. This film may be used for many purposes such as support for photographic film.

It may be coated with a silver halide photographic emulsion, may be used as support for magnetic tape, and the like.

It will also be appreciated that variations and modifications may be used so that different lubricants and/or additives may be used on different surfaces. For instance, an abrasive material such as silica can be used on surfaces which contact each other and which might otherwise damage the surface of the compression rolls. Films of a different gauge may be prepared from strips of a different gauge.

In the above process the compression rolling has been carried out using a lubricant in order to avoid the necessity of using extremely high pressure compression rolling. However, the high pressure compression rolling equipment suitable for cold rolling metals, such as aluminum or the like, can be employed for the compression rolling dry of the two or more thermoplastic sheets which may be compression rolled to obtain the sheets described herein.

The number of strips which can be rolled at one time depends upon the equipment, the thickness of the beginning strips, desired thickness of the finished film, nature of the polyolefins, etc. Possibly ten or more might be run at one time.

The invention has been described in detail with particular reference to particular embodiments thereof, but it will be understood that variations can be effected within the spirit and scope of the invention as described hereinabove and as defined in the appended claims.

We claim:

1. A process for producing transparent crystalline polymer films comprising heating a crystalline polymer to produce a clear melt, forming translucent sheets 2 to 10 times the thickness desired in the finished films, simultaneously passing at least two superimposed translucent sheets between rollers with the aid of a lubricant between the surface of said sheets and said rollers to produce transparent final sheets having a thickness of ½ to 1/10 that of the translucent sheets.

2. A process of producing transparent crystalline polymer films comprising heating a crystalline polymer to produce a clear melt, forming translucent sheets 2 to 10 times the thickness desired in the finished sheet, covering the surfaces of said translucent sheets with a lubricant, simultaneously passing at least two superimposed translucent sheets between rollers with the aid of said lubricant in the area of roller pressure to produce transparent final sheets having a thickness of ½ to 1/10 of the translucent sheets.

3. The process as set forth in claim 2 in which said crystalline polymer is a polyolefin.

4. A process as set forth in claim 3 in which said polyolefin is polyethylene having a density of .91 to .97 gram per cc.

5. A process as set forth in claim 3 in which the polyolefin is polypropylene.

6. A process for producing transparent crystalline polymer films comprising heating a crystalline polymer to form a clear melt, extruding said clear melt as a tubular shape having a wall thickness 2 to 10 times the desired thickness into a lubricant quench bath, expanding the tubular shape by means of a liquid lubricant having a density greater than that of the quench bath enclosed in the tubular shape, passing the tubular shape between rollers with the aid of said quench bath and liquid lubricant as external and internal lubricants respectively to produce transparent final sheets having a thickness of ½ to 1/10 that of the translucent sheets.

7. A process as set forth in claim 6 in which said crystalline polymer is polyolefin.

8. A process as set forth in claim 7 in which said polyolefin is polyethylene having a density of .91 to .97.

9. A process as set forth in claim 7 in which said polyolefin is polypropylene.

References Cited by the Examiner

UNITED STATES PATENTS

| 2,219,700 | 10/40 | Perrin et al. | 18—56 |
| 2,244,208 | 6/41 | Miles | 18—56 |
| 2,337,927 | 12/43 | Reichel et al. | 18—14 |
| 2,497,376 | 2/50 | Swallow et al. | 18—56 |
| 2,541,064 | 2/51 | Irons | 18—57 |
| 2,688,773 | 9/54 | McIntire | 18—57 |
| 2,718,666 | 9/55 | Knox | 18—57 |
| 3,083,410 | 4/63 | McGlamery | 264—289 XR |

FOREIGN PATENTS

| 206,656 | 8/56 | Australia. |
| 510,145 | 2/55 | Canada. |
| 584,684 | 10/59 | Canada. |
| 765,904 | 1/57 | Great Britain. |
| 773,718 | 5/57 | Great Britain. |

ALEXANDER H. BRODMERKEL, *Primary Examiner.*

WILLIAM J. STEPHENSON, *Examiner.*